(12) United States Patent
Takami et al.

(10) Patent No.: US 8,404,387 B2
(45) Date of Patent: Mar. 26, 2013

(54) NONAQUEOUS ELECTROLYTE BATTERY AND BATTERY PACK

(75) Inventors: Norio Takami, Yokohama (JP); Hiroki Inagaki, Kawasaki (JP); Keigo Hoshina, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1122 days.

(21) Appl. No.: 12/169,348

(22) Filed: Jul. 8, 2008

(65) Prior Publication Data

US 2009/0029249 A1    Jan. 29, 2009

(30) Foreign Application Priority Data

Jul. 12, 2007    (JP) .................................. 2007-183564

(51) Int. Cl.
*H01M 4/13*    (2010.01)
(52) U.S. Cl. .................... 429/231.95; 429/188; 429/221; 429/223; 429/224; 429/231.6; 429/306; 429/325; 429/326
(58) Field of Classification Search .................. 429/188, 429/306, 322, 326, 221, 231.6, 231.95, 223–224
See application file for complete search history.

(56) References Cited

U.S. PATENT DOCUMENTS

| | | | | |
|---|---|---|---|---|
| 4,937,154 | A * | 6/1990 | Moses et al. ..................... | 429/94 |
| 5,976,489 | A * | 11/1999 | Saidi et al. ...................... | 423/599 |
| 2002/0034689 | A1* | 3/2002 | Hoshida et al. ................ | 429/254 |
| 2005/0084757 | A1* | 4/2005 | Kweon et al. ................ | 429/231.1 |
| 2006/0068272 | A1* | 3/2006 | Takami et al. .................. | 429/62 |
| 2006/0078801 | A1* | 4/2006 | Yamaguchi et al. .......... | 429/326 |
| 2007/0009797 | A1* | 1/2007 | Takami et al. ............. | 429/231.1 |
| 2007/0148555 | A1* | 6/2007 | Fukaya et al. ................ | 429/331 |

FOREIGN PATENT DOCUMENTS

| | | |
|---|---|---|
| CN | 1893066 A | 1/2007 |
| JP | 2001-143702 | 5/2001 |
| JP | 2002-42889 | 2/2002 |
| JP | 2003221234 A | 8/2003 |
| JP | 2004-296256 | 10/2004 |

(Continued)

OTHER PUBLICATIONS

Cho, et al., "*Synthesis, Thermal, and Electrochemical Properties of $AlPO_4$ Coated $LiNi_{0.8}Co_{0.1}Mn_{0.1}O_2$ Cathode Materials for a Li-Ion Cell*", Journal of The Electrochemical Society, 151 (11) A1899-A1904 (2004).

(Continued)

*Primary Examiner* — Patrick Ryan
*Assistant Examiner* — Ben Lewis
(74) *Attorney, Agent, or Firm* — Ohlandt, Greeley, Ruggiero and Perle, L.L.P.

(57) ABSTRACT

A nonaqueous electrolyte battery includes a positive electrode, a negative electrode and a nonaqueous electrolyte. The positive electrode contains active material particles and a coating material. The active material particles are represented by any one of the following formulae (1) to (3) and have an average particle diameter of 0.1 to 10 μm. The coating material comprises at least particles having an average particle diameter of 60 nm or less or layers having an average thickness of 60 nm or less. The particles or the layers contain at least one element selected from the group consisting of Mg, Ti, Zr, Ba, B and C.

$$Li_xM1_yO_2 \quad (1)$$

$$Li_zM2_{2w}O_4 \quad (2)$$

$$Li_sM3_tPO_4 \quad (3)$$

20 Claims, 5 Drawing Sheets

FOREIGN PATENT DOCUMENTS

| | | | |
|---|---|---|---|
| JP | 2005267857 A | 9/2005 |
| JP | 2007005073 A | 1/2007 |
| JP | 2007018883 A | 1/2007 |
| JP | 2007-087875 A | 4/2007 |

OTHER PUBLICATIONS

Cho, et al., "*Comparison of Overcharge Behavior of $AlPO_4$ Coated $LiCoO_2$ and $LiNi_{0.8}Co_{0.1}Mn_{0.1}$ $O_2$ Cathode Materials in Li-Ion Cells*", Journal of The Electrochemical Society, 151 (10) A1707-A1711-(2004).

Official Action dated Sep. 8, 2009 for corresponding Japanese patent application No. 2007-183564 (with English translation).

Japanese Office Action (with English translation) dated Sep. 14, 2010 from corresponding JP Application No. 2007-183564.

* cited by examiner

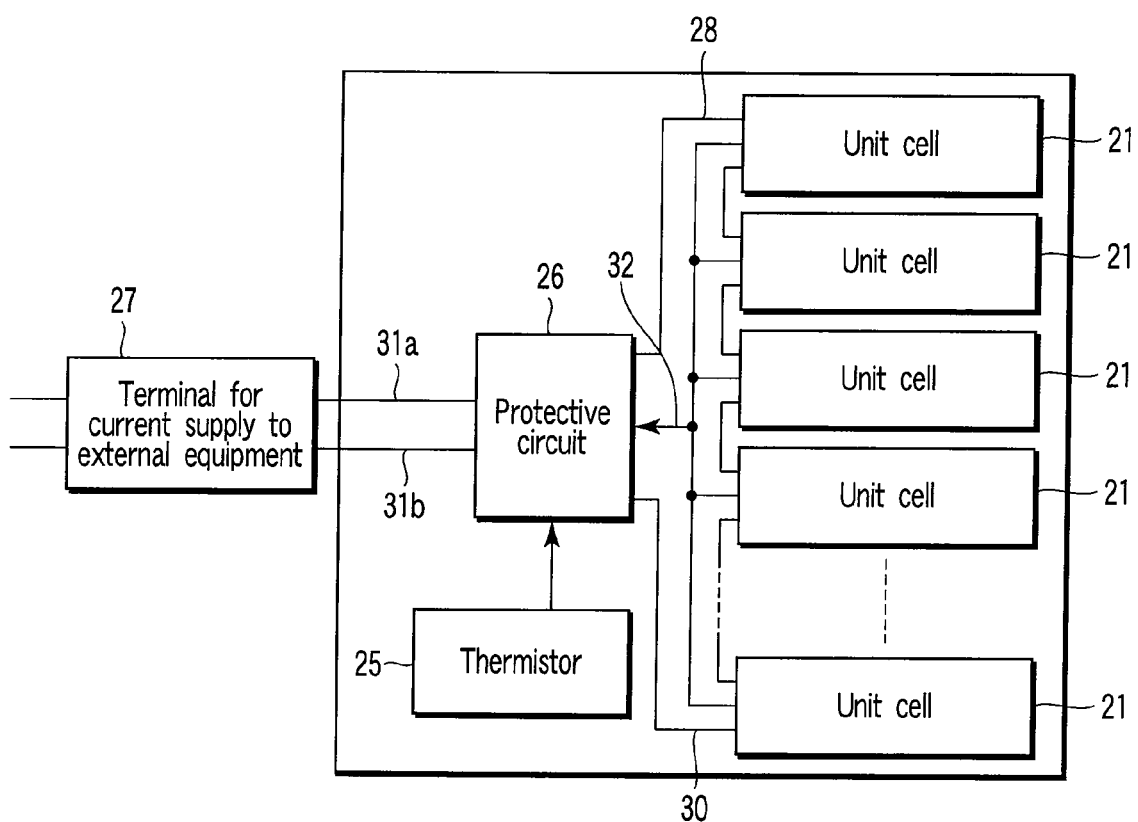
F I G. 5

NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2007-183564, filed Jul. 12, 2007, the entire contents of which are incorporated herein by reference.

BACKGROUND OF THE INVENTION

1. Field of the Invention

The present invention relates to a nonaqueous electrolyte battery and to a battery pack using a nonaqueous electrolyte battery.

2. Description of the Related Art

Nonaqueous electrolyte batteries using a negative electrode containing a lithium metal, lithium alloy, lithium compound or carbonaceous material are expected as high-energy-density batteries and are being exhaustively researched and developed. Lithium ion batteries provided with a positive electrode containing $LiCoO_2$ or $LiMn_2O_4$ as an active material and with a negative electrode containing a carbonaceous material which absorbs and releases lithium have been widely put to practical use so far. Also, with regard to the negative electrode, studies are being made as to metal oxides and alloys which are to be used in place of the above carbonaceous material. In the case of mounting a battery, particularly, in vehicles such as cars, materials superior in chemical and electrochemical stability, strength and corrosion resistance are desired as the structural material of the negative electrode to obtain a long cycle performance in a high-temperature environment and long reliability in high output. Moreover, it is demanded that batteries have high performance in cold regions in the case of mounting them in vehicles such as cars. Specifically, it is required for these batteries to have high output performance and long-cycle life performance in a low-temperature environment. On the other hand, the development of a nonvolatile and noninflammable electrolytic solution is underway to improve safety performance. However, because such an electrolytic solution brings about a deterioration in the output performance, low-temperature performance and long-cycle life performance of a battery, it has not been put to practical use yet.

Various trials have been made to improve the characteristics of a negative electrode. JP-A 2002-42889 (KOKAI) discloses that a negative electrode with a current collector made of aluminum or an aluminum alloy, which supports a specific metal, alloy or compound is used in a nonaqueous electrolyte secondary battery. Also, JP-A 2004-296256 (KOKAI) discloses that an area where a negative electrode active material layer is not formed is disposed on the negative electrode current collector described in the foregoing JP-A 2002-42889 (KOKAI) and this area is made to face a positive electrode active material layer through a separator to improve safety and reliability when a nonaqueous electrolyte secondary battery overcharges. Moreover, JP-A 2004-296256 (KOKAI) also discloses that lithium-nickel-cobalt-aluminum oxide represented by the formula, $LiNi_{0.8}Co_{0.15}Al_{0.05}O_2$ is used as a positive electrode active material. As disclosed in JP-A 2004-296256 (KOKAI), if a solid solution containing a heterogeneous element such as Al is used as a positive electrode active material, the amount of lithium absorbed in the positive electrode active material is reduced.

In the meantime, JP-A 2001-143702 (KOKAI) discloses a method using, as a negative electrode active material, secondary particles obtained by coagulating primary particles having an average particle diameter less than 1 µm which are made of a lithium titanate compound represented by the formula, $Li_aTi_{3-a}O_4$ (0<a<3), into granules having an average particle diameter of 5 to 100 µm, to thereby suppress the coagulation of secondary particles, thereby increasing the production yield of a large-area negative electrode for large-size batteries.

Also, studies are made as to an improvement of a nonaqueous electrolyte to thereby attain low-temperature performance and high-temperature cycle life performance at the same time. However, a nonaqueous electrolyte having high ion conductivity at low temperatures tends to react easily with a positive electrode at high temperatures, leading to remarkably reduced cycle life performance.

BRIEF SUMMARY OF THE INVENTION

According to a first aspect of the present invention, there is provided a nonaqueous electrolyte battery comprising:

a positive electrode containing active material particles and a coating material which covers a surface of each of the active material particles, wherein the active material particles are represented by any one of the following formulae (1) to (3) and have an average particle diameter of 0.1 to 10 µm, the coating material comprises at least particles having an average particle diameter of 60 nm or less or layers having an average thickness of 60 nm or less, the particles or the layers containing at least one element selected from the group consisting of Mg, Ti, Zr, Ba, B and C;

a negative electrode including a metal compound absorbing lithium ions at 0.4 V (vs. Li/Li+) or more;

a separator interposed between the positive electrode and the negative electrode; and a nonaqueous electrolyte including a mixture solvent and a lithium salt to be dissolved in the mixture solvent, the mixture solvent containing a first nonaqueous solvent containing at least one of propylene carbonate and ethylene carbonate and a second nonaqueous solvent containing at least one of γ-butyrolactone and a nonaqueous solvent having a nitrile group and a molecular weight of 40 to 100, and a content of the second nonaqueous solvent in the mixture solvent being 10 to 70% by volume:

$$Li_xM1_yO_2 \qquad (1)$$

$$Li_zM2_{2w}O_4 \qquad (2)$$

$$Li_sM3_tPO_4 \qquad (3)$$

where M1, M2 and M3, which may be the same or different, respectively represent at least one element selected from the group consisting of Mn, Ni, Co and Fe, and x, y, z, w, s and t satisfy the following requirements: $0<x \leq 1.1$, $0.8 \leq y \leq 1.1$, $0<z \leq 1.1$, $0.8 \leq w \leq 1.1$, $0<s \leq 1.1$ and $0.8 \leq t \leq 1.1$.

According to a second aspect of the present invention, there is provided a battery pack comprises a nonaqueous electrolyte battery, the nonaqueous electrolyte battery comprising:

a positive electrode containing active material particles and a coating material which covers a surface of each of the active material particles, wherein the active material particles are represented by any one of the following formulae (1) to (3) and have an average particle diameter of 0.1 to 10 µm, the coating material comprises at least particles having an average particle diameter of 60 nm or less or layers having an average thickness of 60 nm or less, the particles or the layers containing at least one element selected from the group consisting of Mg, Ti, Zr, Ba, B and C;

a negative electrode including a metal compound absorbing lithium ions at 0.4 V (vs. Li/Li+) or more;

a separator interposed between the positive electrode and the negative electrode; and a nonaqueous electrolyte including a mixture solvent and a lithium salt to be dissolved in the mixture solvent, the mixture solvent containing a first nonaqueous solvent containing at least one of propylene carbonate and ethylene carbonate and a second nonaqueous solvent containing at least one of γ-butyrolactone and a nonaqueous solvent having a nitrile group and a molecular weight of 40 to 100, and a content of the second nonaqueous solvent in the mixture solvent being 10 to 70% by volume:

(1)

(2)

(3)

where M1, M2 and M3, which may be the same or different, respectively represent at least one element selected from the group consisting of Mn, Ni, Co and Fe, and x, y, z, w, s and t satisfy the following requirements: $0<x\leq1.1$, $0.8\leq y\leq1.1$, $0<z\leq1.1$, $0.8\leq w\leq1.1$, $0<s\leq1.1$ and $0.8\leq t\leq1.1$.

BRIEF DESCRIPTION OF THE SEVERAL VIEWS OF THE DRAWING

FIG. 5 is a block diagram showing an electric circuit of a battery pack of FIG. 4.

DETAILED DESCRIPTION OF THE INVENTION

First Embodiment

Figure 1:
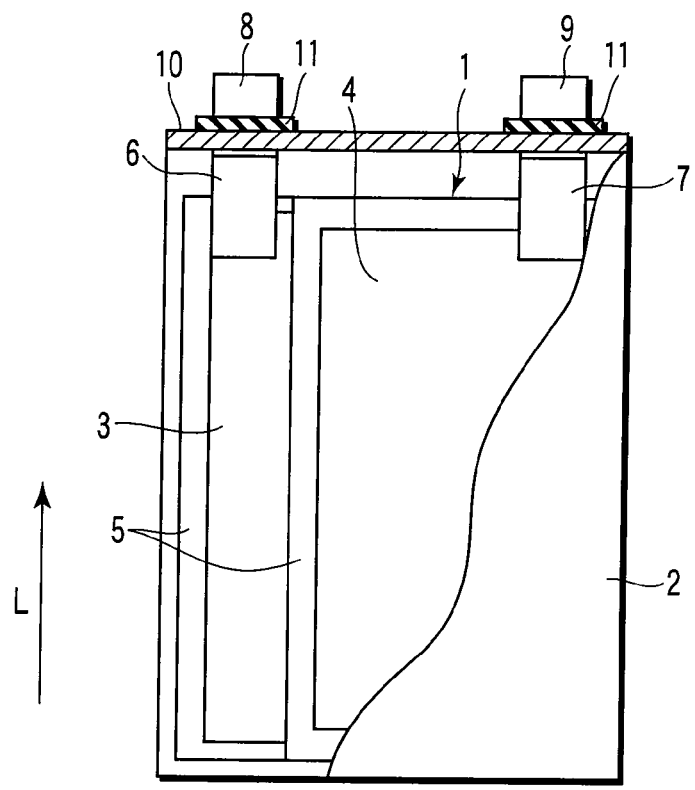
FIG. 1 is a partially broken sectional view showing a nonaqueous electrolyte battery according to a first embodiment.

A nonaqueous electrolyte battery according to this embodiment comprises the structures shown in the following (A) to (C).

(A) The nonaqueous electrolyte contains a mixture solvent and a lithium salt to be dissolved in the mixture solvent. This mixture solvent contains a first nonaqueous solvent constituted of one or more of propylene carbonate (PC) and ethylene carbonate (EC) and a second nonaqueous solvent constituted of one or more of γ-butyrolactone and a nonaqueous solvent having a molecular weight of 40 to 100 and a nitrile group. The content of the second nonaqueous solvent in the mixture solvent is 10 to 70% by volume.

(B) The positive electrode contains active material particles and a coating material which exists on the surface of each of the active material particles. The active material particles are represented by any one of the following formulae (1) to (3) and have an average particle diameter of 0.1 to 10 μm. The coating material can be made of particles which contain at least one element selected from the group consisting of Mg, Ti, Zr, Ba, B and C and have an average particle diameter of 60 nm or less. Also, the coating material can be made of layers which contain at least one element selected from the group consisting of Mg, Ti, Zr, Ba, B and C and have an average thickness of 60 nm or less. Further, the coating material can be made of both of the particles and the layers.

(1)

(2)

(3)

Here, M1, M2 and M3, which may be the same or different, respectively represent at least one element selected from the group consisting of Mn, Ni, Co and Fe, and x, y, z, w, s and t satisfy the following requirements: $0<x\leq1.1$, $0.8\leq y\leq1.1$, $0<z\leq1.1$, $0.8\leq w\leq1.1$, $0<s\leq1.1$ and $0.8\leq t\leq1.1$. x, y, z, w, s and t are preferably in the following ranges: $0<x\leq1$, $0.98\leq y\leq1.05$, $0<z\leq1$, $0.98\leq w\leq1.05$, $0<s\leq1$ and $0.98\leq t\leq1.05$.

(C) The negative electrode contains a metal compound that absorbs lithium ions at 0.4 V (vs. Li/Li$^+$) or more.

The present invention is based on the finding that when the positive electrode described in the above (B) and the negative electrode described in the above (C) are used, the nonaqueous electrolyte having the composition shown in the above (A) is limited in redox decomposition at high temperatures, to thereby make it possible to attain low-temperature performance and high-temperature cycle life performance at the same time.

The above nonaqueous solvent which has a nitrile group and a molecular weight of 40 to 100 and γ-butyrolactone respectively have a relatively small molecular weight and a high dielectric constant and therefore greatly contribute to an improvement in the ionic conduction ability of the nonaqueous electrolyte. In the mixture solvent containing the second nonaqueous solvent and first nonaqueous solvent constituted of the above solvent, the ratio of the second nonaqueous solvent is designed to be 10 to 70% by volume, which remarkably improves large-current discharge performance and output performance in a wide temperature range from a temperature as low as about –40° C. to a temperature as high as about 45° C. One factor for this is that a lithium salt having a high concentration can be dissolved in the above mixture solvent even in a low-temperature environment. The ratio of the second nonaqueous solvent in the mixture solvent is more preferably 50 to 67% by volume. This further improves the output performance of the battery in a low-temperature environment (for example, –40° C.).

This nonaqueous electrolyte has the excellent characteristics as mentioned above, whereas it easily undergoes oxidation decomposition and reduction decomposition at high temperatures and therefore deteriorates in high-temperature cycle life performance, failing to attain the low-temperature performance and high-temperature performance at the same time. Since the negative electrode described in the above (C) can limit the reduction decomposition of the second solvent, it can decrease the formation of an insulating coating on the surface of the negative electrode. Then, the positive electrode described in the above (B) can limit the oxidation decomposition reaction of the second solvent without decreasing the effect of the negative electrode on the limitation to the reduction decomposition of the second solvent. Therefore, when the positive and negative electrodes as described in the above (B) and (C) are used, the oxidation decomposition and reduction decomposition of the nonaqueous electrolyte having the composition described in the above (A) at high temperatures can be limited and therefore, a nonaqueous electrolyte battery which is superior in both low-temperature output performance and high-temperature cycle life performance and is improved in high-temperature storage performance can be attained.

Explanations will be given as to each member of the nonaqueous electrolyte battery according to this embodiment.

1) Nonaqueous Electrolyte

The nonaqueous electrolyte has the structure explained in the above (A).

As the nonaqueous solvent having a nitrile group and a molecular weight of 40 or more and 100 or less, one or more nonaqueous solvents selected from acetonitrile (AN), propionitrile (PN), methoxyacetonitrile (MAN) and 3-methoxypropionitrile (MPN) may be used. Because this brings about an increase in the lithium ion conduction ability of the nonaqueous electrolyte under low temperature (for example, −40° C.) to high temperature (for example 45° C.) environments, whereby the output performance of the battery can be more improved.

Also, when as the second nonaqueous solvent, one or more nonaqueous solvents selected from the group consisting of γ-butyrolactone (GBL), propionitrile (PN), methoxyacetonitrile (MAN) and 3-methoxypropionitrile (MPN) are used, the vapor pressure of the nonaqueous electrolyte is reduced at high temperatures, making it possible to use a thin outer package such as a laminate film, which is suitable for the development of a thin type light-weight battery.

The mixture solvent may contain cyclic carbonates, chain carbonates such as diethyl carbonate (DEC), dimethyl carbonate (DMC) and methyl ethyl carbonate, chain ethers such as dimethoxy ethane (DME) and diethoxy ethane (DEE), cyclic ethers such as tetrahydrofuran (THF) and dioxolan (DOX) and sulfolane (SL).

Examples of the lithium salt (lithium salt electrolyte) include lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethasulfonate ($LiCF_3SO_3$), bistrifluoromethylsulfonylimide lithium [$LiN(CF_3SO_2)_2$], $LiN(C_2F_5SO_2)_2$, $Li(CF_3SO_2)_3C$ and $LiB[(OCO)_2]_2$. One or two or more types of electrolytes may be used. Among these materials, lithium tetrafluoroborate ($LiBF_4$) and $LiB[(OCO)_2]_2$ are preferable. Lithium tetrafluoroborate ($LiBF_4$) is particularly preferable. When the lithium salt contains $LiBF_4$, the concentration of $LiBF_4$ in the mixture solvent is to be possible to be 1.5 mol/L or more, whereby the chemical stability of the second nonaqueous solvent is improved and also the electric resistance of the film on the negative electrode can be decreased. As a result, the low-temperature output performance and cycle life performance of the battery can be outstandingly improved.

The foregoing mixture solvent containing the first and second nonaqueous solvents has a high dielectric constant though it has a low viscosity and therefore, a lithium salt having a high concentration may be dissolved and used. Accordingly, the concentration of the lithium salt in the mixture solvent is preferably in the range of 1.5 mol/L to 2.5 mol/L. This ensures that high power can be drawn in a low-temperature environment. When the concentration of the lithium salt is less than 1.5 mol/L, the concentration of lithium ions at the boundary between the positive electrode and the nonaqueous electrolyte when the battery discharges under a large current sharply lowers and there is therefore a concern that the power remarkably lowers. When the concentration of the lithium salt exceeds 2.5 mol/L on the other hand, the viscosity of the nonaqueous electrolyte is so high that the transfer speed of lithium ions is reduced and there is the possibility of a significant reduction in power.

As the nonaqueous electrolyte, besides a liquid electrolyte prepared by dissolving a lithium salt in a nonaqueous solvent, a gel electrolyte obtained by forming a complex of the foregoing liquid electrolyte and a polymer material or a solid electrolyte obtained by forming a complex of a lithium salt and a polymer material may be used. Examples of the polymer material include polyvinylidene fluoride (PVdF), polyacrylonitrile (PAN) and polyethylene oxide (PEO). Also, the nonaqueous electrolyte may contain a room temperature molten salt made of a nonvolatile and noninflammable ionic liquid.

2) Negative Electrode

This negative electrode comprises a negative electrode current collector and a negative electrode layer which is supported on one or both surfaces of the negative electrode current collector and contains an active material, a conductive agent and a binder.

As the active material of the negative electrode, the metal compound explained in the above (C) is used. The reason why the lithium ion absorbing potential of the metal compound is limited to 0.4 V (vs. $Li/Li^+$) or more is explained below. Examples of the active material that absorbs lithium ions at a potential less than 0.4 V (vs. $Li/Li^+$) include carbonaceous materials and lithium metals. If these active materials are used, the reduction decomposition of the second solvent occurs and the battery is deteriorated not only in output performance and charge and discharge cycle performance but also in other performances. The upper limit of the lithium ion absorbing potential is preferably 3 V (vs. $Li/Li^+$) and more preferably 2 V (vs. $Li/Li^+$).

The metal compound capable of absorbing lithium ions at a potential range of 0.4 to 3 V (vs. $Li/Li^+$) is desirably metal oxides, metal sulfides or metal nitrides.

Examples of the metal oxides include lithium-titanium containing composite oxides such as titanium oxide and lithium-titanium oxide, tungsten oxides such as $WO_3$, amorphous tin oxides such as $SnB_{0.4}P_{0.6}O_{3.1}$, tin-silicon oxides such as $SnSiO_3$ and silicon oxides such as $SiO$. Among these compounds, titanium oxides and lithium-titanium oxides are preferable. The use of these lithium-titanium oxide and titanium oxide prevents the second nonaqueous solvent from reduction decomposition, which outstandingly improves the cycle life performance of the battery at high temperatures.

Examples of the lithium-titanium oxides include lithium titanate having a spinel structure such as $Li_{4+x}Ti_5O_{12}$ (x varies in the range: $-1 \leq x \leq 3$, depending on a charge/discharge reaction) and lithium titanate having a ramsdellite structure such as $Li_{2+y}Ti_3O_7$ (y varies in the range: $-1 \leq y \leq 3$, depending on a charge/discharge reaction).

As the titanium oxide, those containing Li or no Li before charging may be all used. Examples of titanium oxides containing no Li before charge/discharge operations, that is, in their synthesis include titanium oxides such as $TiO_2$ and titanium composite oxides containing Ti and at least one element selected from the group consisting of P, V, Sn, Cu, Ni and Fe. $TiO_2$ is preferably one which is an anatase type, is heat-treated at a temperature of 300 to 500° C. and has low crystallinity. Examples of the titanium composite oxides include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni and Fe). The above titanium composite oxide preferably has low crystallinity and has a microstructure in which a crystal phase and an amorphous phase coexist or an amorphous phase exists independently. When the titanium composite oxide has such a microstructure, the cycle performance can be outstandingly improved.

Examples of titanium oxides include $Li_aTiO_2$ ($0 \leq a \leq 1.1$).

Examples of the metal sulfides include titanium sulfide such as $TiS_2$, molybdenum sulfide such as $MoS_2$ and iron sulfide such as FeS, $FeS_2$ and $Li_xFeS_2$.

Examples of the metal nitrides include lithium-cobalt nitride such as $Li_xCo_yN$ ($0<x<4$, $0<y<0.5$).

The average particle diameter of the metal compound is preferably 1 μm or less. When the average particle diameter exceeds 1 μm, there is a concern that the nonaqueous electrolyte battery fails to obtain high output performance. However, when the average particle diameter is small, this causes easy coagulation of particles, so that the distribution of the nonaqueous electrolyte is inclined to the negative electrode and there is therefore a concern that the exhaustion of the electrolyte at the positive electrode is caused and therefore, the lower limit of the particle diameter is desirably designed to be 0.001 μm.

The metal compound desirably has the average particle diameter of 1 μm or less and the specific surface area when it is measured by a BET method using $N_2$ adsorption in the range of 3 to 200 $m^2/g$. This further improves the affinity of the negative electrode to the nonaqueous electrolyte.

The specific surface area of the negative electrode is desirably in the range of 3 to 50 $m^2$. The specific surface area is more preferably in the range of 5 to 50 $m^2/g$. Here, the specific surface area of the negative electrode means a surface area per 1 g of the negative electrode layer excluding the current collector. Also, the negative electrode layer is a porous layer which is supported on the current collector and includes a negative electrode active material, a conductive agent and a binder.

The porosity of the negative electrode excluding the current collector is desirably designed to be in the range of 20 to 50%. This makes possible to obtain a negative electrode having high affinity to the nonaqueous electrolyte and a high density. The porosity is more preferably in the range of 25 to 40%.

The negative electrode current collector is desirably an aluminum foil or an aluminum alloy foil. The thickness of the aluminum foil or aluminum alloy foil is preferably 20 μm or less and more preferably 15 μm or less. The purity of the aluminum foil is preferably 99.99 mass % or more. As the aluminum alloys, alloys containing elements such as magnesium, zinc and silicon are preferable. In the meantime, the content of transition metals such as iron, copper, nickel and chromium in the negative electrode current collector is desirably designed to be 100 mass-ppm or less.

As the conductive agent, for example, carbon materials may be used. Examples of the carbon materials include acetylene black, carbon black, cokes, carbon fibers, graphite, aluminum powder and TiO. As the conductive agent, cokes which have an average particle diameter of 10 μm or less and are heat-treated at a temperature from 800° C. to 2000° C., graphite, TiO powder and carbon fibers having an average fiber diameter of 1 μm or less are more preferable. The BET specific surface area of the above carbon material measured using $N_2$ adsorption is 10 $m^2/g$ or more.

Examples of the binder include polytetrafluoroethylene (PTFE), polyvinylidene fluoride (PVdF), fluorine rubbers, styrene butadiene rubber and core-shell binders.

The compounding ratio of the above negative electrode active material, conductive agent and binder is preferably as follows: the negative electrode active material: 80 to 95% by weight, the conductive agent: 3 to 18% by weight and the binder: 2 to 7% by weight.

The negative electrode is manufactured, for example, by suspending the aforementioned negative electrode active material, conductive agent and binder in a proper solvent and by applying this suspension to the current collector, followed by drying and pressing under heating.

3) Positive Electrode

This positive electrode comprises a positive electrode current collector, and a positive electrode layer which is supported on one or both surfaces of the positive electrode current collector and contains an active material, a conductive agent and a binder.

The active material of the positive electrode contains the active material particles and coating material which are explained in the above (B).

First, the active material particles represented by the formula (1) will be explained. M1 is desirably at least one element selected from the group consisting of Mn, Ni and Co. More preferable examples of the positive electrode active material include lithium-manganese composite oxides such as $Li_xMnO_2$, lithium-nickel-cobalt composite oxides such as $Li_xNi_{1-a}CO_aO_2$ ($0.1 \leq a \leq 0.5$), lithium-cobalt composite oxides such as $Li_xCoO_2$, lithium-nickel-manganese-cobalt composite oxides such as $Li_xNi_{1-b-c}Mn_bCo_cO_2$ ($0.1 \leq b \leq 0.5$, $0 \leq c \leq 0.5$) and lithium-manganese-cobalt composite oxides such as $Li_xMn_{1-d}Co_dO_2$ ($0.1 \leq d \leq 0.5$). These compounds have high heat stability and ensure high safety.

With regard to the active material particles represented by the formula (2), M2 is desirably at least one element selected from the group consisting of Mn and Ni. More preferable examples of the positive electrode active material include $Li_zMn_2O_4$ and spinel type lithium-manganese-nickel composite oxides such as $Li_zMn_{2-e}Ni_eO_4$ ($0.3 \leq e \leq 0.8$). These compounds have high heat stability and ensure high safety.

With regard to the active material particles represented by the formula (3), M3 is desirably at least one element selected from the group consisting of Fe, Mn and Co. More preferable examples of the positive electrode active material include lithium-phosphorous oxides having an olivine structure. Examples of the lithium-phosphorous oxide include $Li_sFePO_4$, $Li_sFe_{1-f}Mn_fPO_4$ ($0 \leq f \leq 1$), $Li_sNiPO_4$, and $Li_sCoPO_4$. These compounds have high heat stability and ensure high safety.

Particularly, examples of the positive electrode active material which is significantly improved in low-temperature output performance and high-temperature cycle life performance when the mixture solvent explained in the above (A) is used include $Li_xCoO_2$, $Li_xNi_{1-b-c}Mn_bCo_cO_2$, $Li_zMn_2O_4$, $Li_zMn_{2-e}Ni_eO_4$ and $Li_sFePO_4$. This is because the growth of a film formed on the surface of the positive electrode is suppressed, so that the electric resistance of the positive electrode is decreased. Also, the stability of the battery in a high-temperature environment is improved, thereby remarkably improving storage stability.

The elements such as Mg, Ti, Zr, Ba and B are preferably adsorbed to the surface of active material particles in the form of compound particles such as metal oxide particles and phosphorous oxide particles. Or, the foregoing element is preferably made into the form of compound layers such as metal oxide layers or phosphorous oxide layers to cover the surface of the active material particles instead of being adsorbed in the form of compound particles. Examples of the above metal oxides include MgO, $ZrO_2$, $TiO_2$, BaO and $B_2O_3$. Examples of the above phosphorous oxides include $Mg_3(PO_4)_2$. As to C, carbon particles are preferably adsorbed to the surface of the active material particles.

In the case of using particles (hereinafter referred to as element-containing particles) containing at least one element selected from the group consisting of Mg, Ti, Zr, Ba, B and C, the average particle diameter of the active material particles is designed to be 0.1 µm or more and 10 µm or less and the average particle diameter of the element-containing particles is designed to be 60 nm or less. If the average particle diameter of the element-containing particles is set to 60 nm or less when the average particle diameter of the active material particles is less than 0.1 µm, a large part of the surface of the active material particles is coated with the element-containing particles and therefore, the ability of the active material particles to absorb and release lithium ions is hindered by the element-containing particles, resulting in no improvement in performance. Also, if the average particle diameter of the element-containing particles is set to 60 nm or less when the average particle diameter of the active material particles exceeds 10 µm, the element-containing particles are present sparsely on the surface of the active material particles and therefore, the effect of suppressing the oxidation decomposition of the second nonaqueous solvent is not obtained. When the average particle diameter of the active material particles is designed to be from 0.1 µm to 10 µm and the average particle diameter of the element-containing particles is designed to be 60 nm or less, the oxidation decomposition reaction of the second nonaqueous solvent can be suppressed without hindering the positive electrode active material from absorbing and releasing lithium ions. The lower limit of the average particle diameter of the element-containing particles is desirably designed to be 0.1 nm in order to obtain a satisfactory effect.

In the case of using the layers (hereinafter referred to as element-containing layers) containing at least one element selected from the group consisting of Mg, Ti, Zr, Ba, B and C, the average particle diameter of the active material particles is designed to be 0.1 µm or more and 10 µm or less and the average thickness of the element-containing layers is designed to be 60 nm or less. If the average thickness of the element-containing layers is set to 60 nm or less when the average particle diameter of the active material particles is less than 0.1 µm, the ratio of the thickness of the element-containing layers to the size of the active material particles is large and therefore, the ability of the active material particles to absorb and release lithium ions is hindered by the element-containing layers, resulting in no improvement in performance. Also, if the average thickness of the element-containing layers is set to 60 nm or less when the average particle diameter of the active material particles exceeds 10 µm, the ratio of the thickness of the element-containing layers to the size of the active material particles is unsatisfactory and therefore the oxidation decomposition of the second nonaqueous solvent is not suppressed. When the average particle diameter of the active material particles is designed to be from 0.1 µm to 10 µm and the average thickness of the element-containing layers is designed to be 60 nm or less, the oxidation decomposition reaction of the second nonaqueous solvent can be suppressed without hindering the positive electrode active material from absorbing and releasing lithium ions. The lower limit of the average thickness of the element-containing layers is desirably designed to be 0.1 nm in order to obtain a satisfactory effect.

When the foregoing coating material is formed on the surface of each of the active material particles represented by the above formula (1) or (2), the reactivity of the positive electrode active material to the nonaqueous electrolyte can be lowered because the crystallinity of the coating material is lower than that of the active material particles. This limits the oxidation decomposition reaction of the second nonaqueous solvent. In this case, the element to be used in the coating material is preferably Mg, Ti, Zr, Ba or B. Particularly preferable element is Mg and Ti.

When the coating material mentioned above is formed on each of the active material particles represented by the formula (3), the electroconductivity of the active material particles is improved, so that the overvoltage of the positive electrode is reduced, and it is therefore possible to suppress the oxidation decomposition of the second nonaqueous solvent and particularly, the oxidation decomposition of the second nonaqueous solvent during charging. In this case, C, Mg or Ti is preferable as the element used for the coating material. Among these elements, C is particularly preferable.

The weight of the coating material preferably corresponds to 0.001% by weight or more and 3% by weight or less of the total weight of the active material particles and coating material. When the weight of the coating material exceeds the above maximum value, this causes an increase in the electric resistance at the boundary between the positive electrode and the nonaqueous electrolyte, leading to a deterioration in output performance and is therefore not preferred. Also, when the weight of the coating material is less than the above minimum value, this is not preferred because the reactivity of the coating material with the nonaqueous electrolyte is increased in a high-temperature environment, bringing about a significant deterioration in cycle life performance. The weight ratio is more preferably 0.01 to 1% by weight.

The average particle diameter and average thickness of the active material particles, element-containing particles and element-containing layers are found by TEM image observation and by the measurement of elemental distribution image using EDX.

The positive electrode active material is obtained by dispersing the active material particles in a solution containing at least one element selected from the group consisting of Mg, Ti, Zr, Ba, B and C, followed by drying and by baking the dried dispersion at 400 to 800° C. As to the baking atmosphere, the dried dispersion is baked in a reducing atmosphere when C is used as the element or in the air when elements other than C is used.

Examples of the conductive agent include acetylene black, carbon black and graphite.

Examples of the binder include polytetrafluoroethylene (PTFE), polyvinylidene fluoride (PVdF) and fluorine rubbers.

The compounding ratio of the above positive electrode active material, conductive agent and binder is preferably as follows: the positive electrode active material: 80 to 95% by weight, the conductive agent: 3 to 19% by weight and the binder: 1 to 7% by weight.

The positive electrode is manufactured, for example, by suspending the positive electrode active material, conductive agent and binder in a proper solvent and by applying this suspension to the current collector made of an aluminum foil or an aluminum alloy foil, followed by drying and pressing. The specific surface area of the positive electrode layer is measured by a BET method in the same manner as in the case of the negative electrode and is preferably in the range of 0.1 to 2 m$^2$/g.

The current collector is preferably made of an aluminum foil or an aluminum alloy foil. The thickness of the current collector is preferably 20 µm or less and more preferably 15 µm or less.

4) Separator

A separator is provided between the positive electrode and the negative electrode. As the separator, a porous film, a nonwoven fabric or the like may be used. Examples of its structural material include synthetic resins (polyolefins such as polyethylene and polypropylene) and cellulose. One or two or more structural materials may be used. Specific examples of the separator include nonwoven fabrics made of synthetic resins, polyethylene porous films, polypropylene porous films and nonwoven fabrics made of celluloses.

5) Container

As the container receiving the positive electrode, negative electrode and nonaqueous electrolyte, a metal container or laminate film container may be used.

As the metal container, metallic cans which are made of aluminum, an aluminum alloy, iron or stainless and have an angular shape or cylinder form may be used. Also, the plate thickness of the container is desirably 0.5 mm or less and more preferably 0.3 mm or less.

Examples of the laminate film include multilayer films obtained by coating an aluminum foil with a resin film. As the resin, a polymer such as polypropylene (PP), polyethylene (PE), nylon and polyethylene terephthalate (PET) may be used. Also, the thickness of the laminate film is preferably 0.2 mm or less. The purity of the aluminum foil is preferably 99.5% or more.

The metallic can made of an aluminum alloy is preferably made of alloys which contain elements such as manganese, magnesium, zinc and silicon and have an aluminum purity of 99.8% or less. Because the strength of the metallic can made of an aluminum alloy is outstandingly increased, whereby the wall thickness of the can be decreased. As a result, a thin, light-weight and high power battery having excellent radiating ability can be attained.

Figure 2:
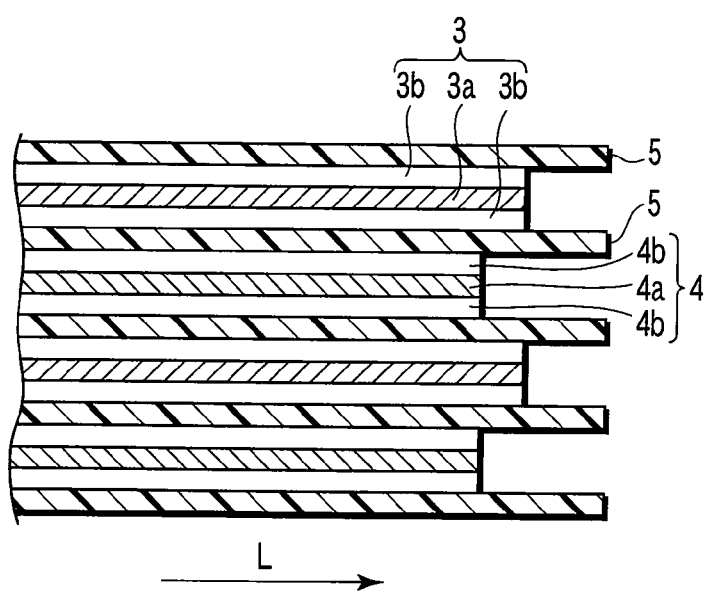
FIG. 2 is an enlarged sectional view of an essential part of an electrode group of a nonaqueous electrolyte battery shown in FIG. 1.

The nonaqueous electrolyte battery according to this embodiment is shown in FIGS. 1 and 2.

As shown in FIG. 1, an electrode group 1 is received in a rectangular cylindrical metallic can 2. The electrode group 1 has a structure in which a separator 5 is interposed between a positive electrode 3 and a negative electrode 4, which is made to have a flat form and is coiled spirally. The electrode group 1 is formed by laminating the positive electrode 3 and negative electrode 4 through the separator 5 interposed therebetween into a flat form, and then coiling these electrodes spirally followed by heating pressing. The nonaqueous electrolyte (not shown) is supported by the electrode group 1. A band-like positive electrode lead 6 is electrically connected to the positive electrode 3. On the other hand, a band-like negative electrode lead 7 is electrically connected to the negative electrode 4. The positive electrode lead 6 is electrically connected to a positive electrode conductive tab 8 and these two members constitute a positive electrode terminal. The negative electrode lead 7 is connected to a negative electrode conductive tab 9 and these two members constitute a negative electrode terminal. A seal plate 10 made of a metal is secured to an opening part of the metallic container 2 by welding or the like. The positive electrode conductive tab 8 and the negative electrode conductive tab 9 are respectively drawn to the outside from a drawing port provided in the seal plate 10. The inside peripheral surface of each drawing port of the seal plate 10 is coated with an insulation member 11 to avoid the development of short circuits caused by the contact between the positive electrode conductive tab 8 and the negative electrode conductive tab 9.

As shown in FIG. 2, the positive electrode 3 is constituted of a positive electrode current collector 3a and a positive electrode layer 3b laminated on both surfaces of the positive electrode current collector 3a. On the other hand, the negative electrode 4 is constituted of a negative electrode current collector 4a and a negative electrode layer 4b laminated on both surfaces of the negative electrode current collector 4a. In the electrode group 1, the positive electrode layer 3b is made to face the negative electrode layer 4b through the separator 5 except for the start and end part of the coil as shown in FIG. 2. The end part of the positive electrode layer 3b is projected over the end part of the negative electrode 4b at both end surfaces of the electrode group 1, perpendicular to a coil axis direction L. In other words, the positive electrode layer 3b covers the negative electrode layer 4b through the separator 5. As a result, the potential at the end part of the positive electrode layer 3b becomes almost the same as the potential at the center of the positive electrode 3b which faces the negative electrode layer 4b and therefore, such a phenomenon that the end part of the positive electrode layer 3b falls into an overcharge state is suppressed. This limits a reaction between a positive electrode active material contained in the end part of the positive electrode layer 3b and the nonaqueous electrolyte. When the end part of the negative electrode layer is projected over the end part of the positive electrode, that is, when the negative electrode layer covers the positive electrode layer, the positive electrode potential at the end part of the positive electrode layer is affected by the negative electrode potential at the part of an unreacted negative electrode layer projected over the positive electrode layer. Therefore, the potential at the end part of the positive electrode layer is an overcharge state when the battery is made to fully charge, whereby the cycle life performance of the battery is remarkably reduced. Accordingly, the area of the positive electrode layer is desirably larger than that of the negative electrode layer. Moreover, it is desirable to constitute an electrode group by coiling or laminating the positive electrode layer, separator and negative electrode layer in the condition that the positive electrode layer is made to face the negative electrode layer via the separator and the positive electrode layer is projected over the negative electrode layer.

The area ratio (Sp/Sn) of the area (Sp) of the positive electrode layer to the area (Sn) of the negative electrode layer is preferably in the range of 1.001 or more and 1.2 or less. When this area ratio exceeds the above range, the effect of improving the high-temperature storage performance is reduced, while the output density of the battery is rather reduced. Also, when the area ratio is less than 1.001, the high-temperature storage performance of the battery is rapidly reduced. The area ratio is more preferably in the range of 1.01 to 1.1. The length ratio (Lp/Ln) of the width (Lp) of the positive electrode to the width (Ln) of the negative electrode is preferably in the range of 1.001 to 1.1.

Figure 3:
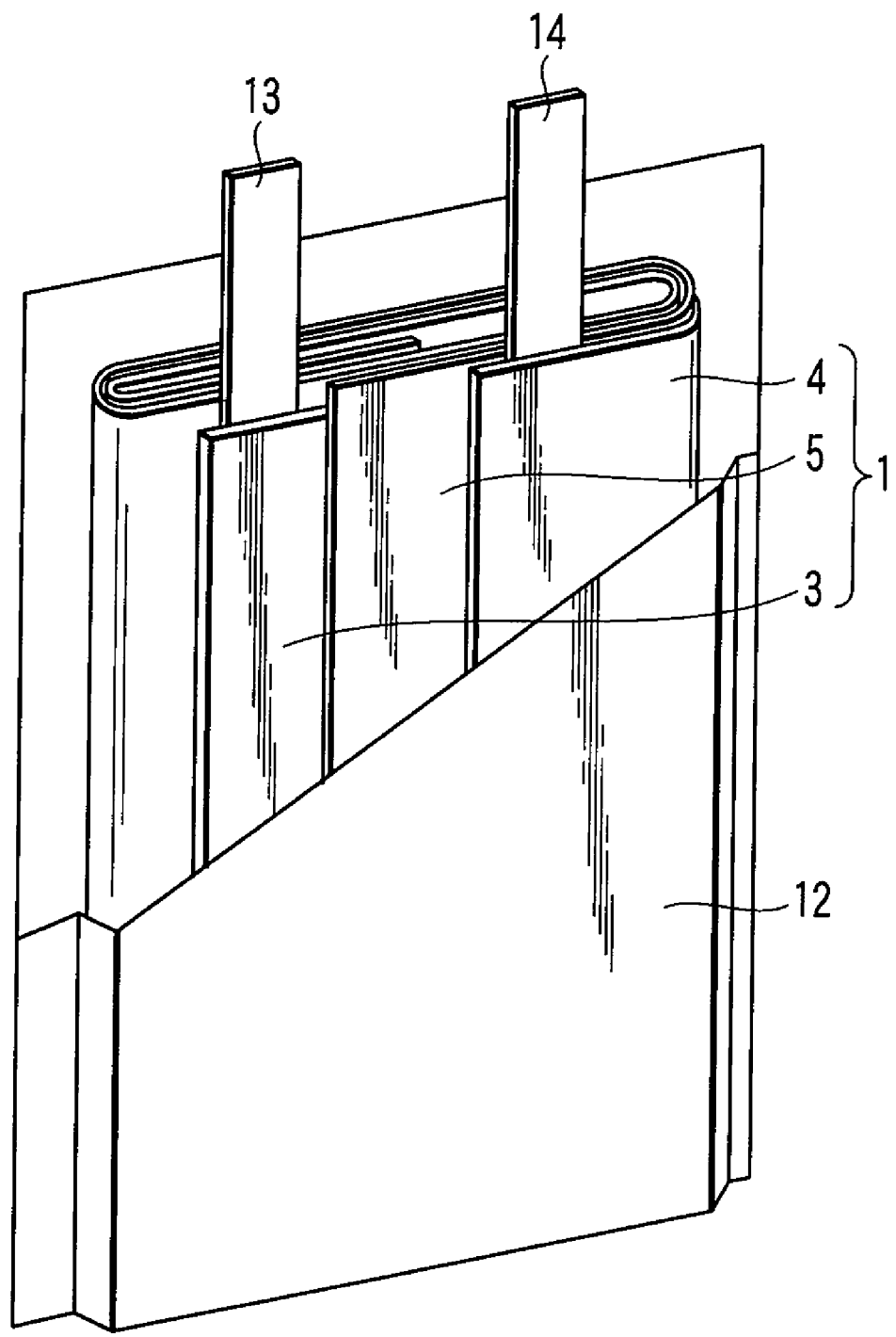
FIG. 3 is a partially broken perspective view showing another nonaqueous electrolyte battery according to a first embodiment.

As is illustrated in FIG. 1, a container made of a laminate film may be used instead of using a metallic container. This example is shown in FIG. 3. In FIG. 3, the same members that are shown in FIG. 1 are designated by the same symbols and explanations of these members are omitted. As shown in FIG. 3, an electrode group 1 is received in a laminate film container 12 formed with heat seal parts on the three sides of the container. A positive electrode terminal 13 doubling as a lead and a conductive tab is electrically connected to a positive electrode 3 of the electrode group 1. On the other hand, a negative electrode terminal 14 doubling as a lead and a conductive tab is electrically connected to a negative electrode 4 of the electrode group 1. Each end of the positive electrode terminal 13 and negative electrode terminal 14 is drawn from a heat seal part of the short sides of a container 12.

It is to be noted that the shape of the electrode group is not limited to the flat and spiral form as illustrated in FIGS. 1 and 3 but may be, for example, a cylindrical and spiral form or a laminate structure. In the case of using a laminate structure, a seat-like separator may be interposed between the positive electrode and the negative electrode, or a positive electrode or a negative electrode may be received in a bag-like separator and one electrode received in the bag-like separator may be laminated alternately on the other electrode. Moreover, a laminate structure may be formed in which a separator is folded zigzag and a positive electrode and a negative electrode are alternately inserted between folded separator parts. In the case of an electrode group having a laminate structure, the end part of the positive electrode layer may be projected over the end part of the negative electrode layer on at least one side of the electrode group.

Second Embodiment

The battery pack according to the second embodiment comprises the nonaqueous electrolyte battery according to the first embodiment. The number of nonaqueous electrolytes may be two or more. It is desirable that the nonaqueous electrolyte battery according to the first embodiment be used as a unit cell and each unit cell be connected electrically in series or in parallel to constitute a battery module. An example of the battery pack according to the second embodiment is shown in FIGS. 4 and 5.

Figure 4:
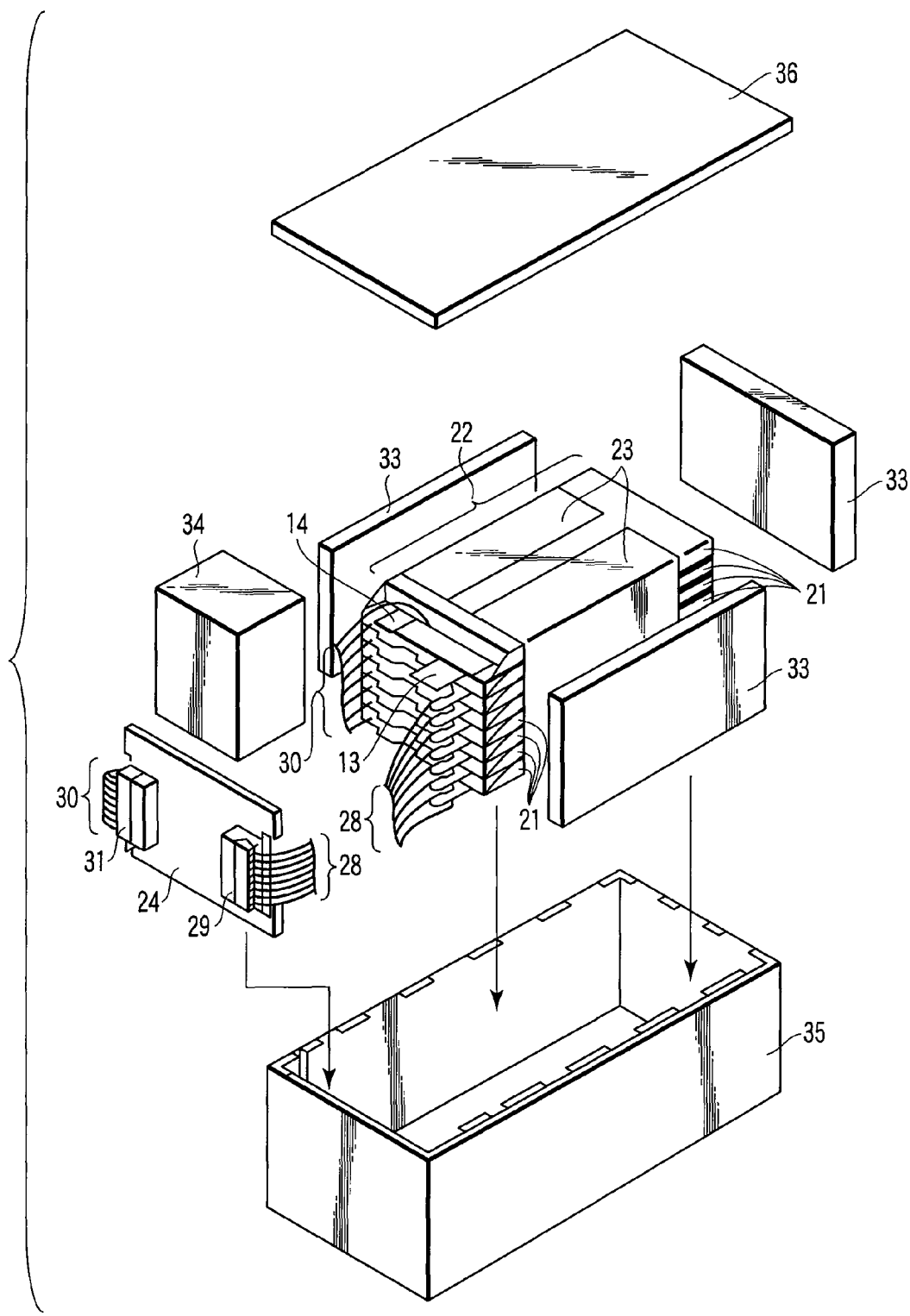
FIG. 4 is an explosion perspective view of a battery pack according to a second embodiment.

A unit cell 21 in a battery pack shown in FIG. 4 is constituted from, for example, a flat type nonaqueous electrolyte battery shown in FIG. 3. However, the unit cell 21 is not limited to this flat type nonaqueous electrolyte battery. A flat type nonaqueous electrolyte battery as shown in FIG. 1 may be used.

The plural unit cells 21 are stacked one upon the other in the thickness direction in a manner to align the protruding directions of the positive electrode terminals 13 and the negative electrode terminals 14. As shown in FIG. 5, the unit cells 21 are connected in series to form a battery module 22. The unit cells 21 forming the battery module 22 are made integral by using an adhesive tape 23 as shown in FIG. 4.

A printed wiring board 24 is arranged on the side surface of the battery module 22 toward which protrude the positive electrode terminals 13 and the negative electrode terminals 14. As shown in FIG. 5, a thermistor 25, a protective circuit 26 and a terminal 27 for current supply to the external equipment are connected to the printed wiring board 24.

As shown in FIGS. 4 and 5, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 5, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 13 and the negative electrode terminals 14. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 4 and 5 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack of the second embodiment is preferably applied to uses where cycle performance under a large current is desired. Specific examples of the application of the battery pack include uses as power sources of digital cameras, and uses for vehicles such as two- to four-wheel hybrid electric cars, two- to four-wheel electric cars, power-assisted bicycles and a rechargeable vacuum cleaner. The uses for vehicles are particularly preferable.

The present invention will be explained in detail by way of examples with reference to the drawings. However, the present invention is not limited to the examples described below.

EXAMPLE 1

Figure 6:
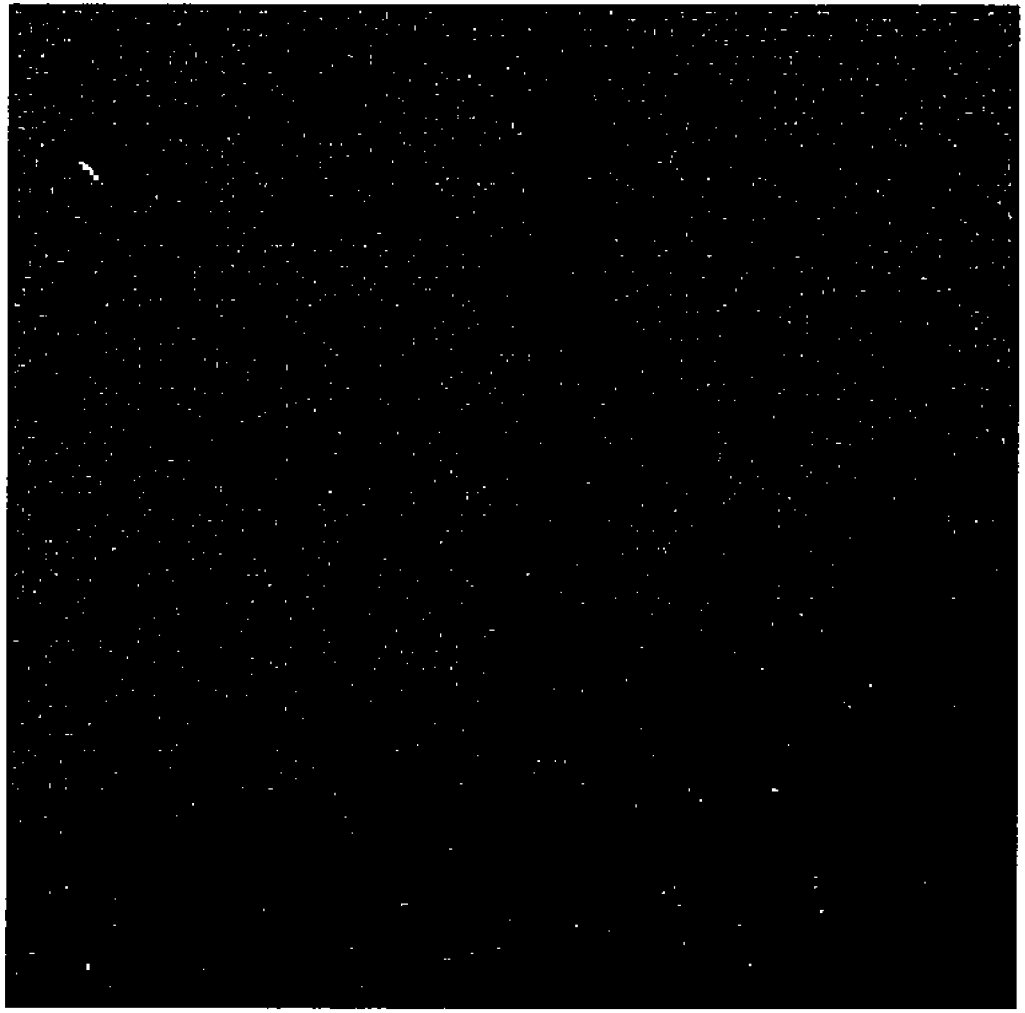
FIG. 6 is an electronic microphotograph of a positive electrode active material used in a nonaqueous electrolyte battery of Example 1.

Lithium-nickel-cobalt-manganese composite active material particles which had an average particle diameter shown in the following Table 1 and a layer structure and is represented by the formula, $LiNi_{1/3}Co_{1/3}Mn_{1/3}O_2$ were prepared as active material particles. These active material particles were dispersed in an ethanol solution in which magnesium acetate $(CH_3COO)_2Mg_4H_2O$ was dissolved, and then dried. The dried dispersion was baked at the temperature shown in Table 1, to thereby prepare a positive electrode active material having a structure in which magnesium oxide (represented by, for example, $MgO_x$, $0<x<1$) microparticles are stuck to the surface of the active material particles. The average particle diameter of $MgO_x$ particles and amount of $MgO_x$ particles to be stuck are shown in the following Table 1. An electron microphotograph obtained when the positive electrode active material was observed using TEM-EDX is shown in FIG. 6. It can be confirmed from FIG. 6 that Mg oxide was stuck granularly to the surface of the active material particles.

To the obtained positive electrode material were added a graphite powder as a conductive agent in an amount of 8% by weight based on the total amount of the positive electrode and PVdF as a binder in an amount of 5% by weight based on the total amount of the positive electrode. These components were dispersed in n-methylpyrrolidone (NMP) solvent to prepare a slurry. The obtained slurry was applied to both surfaces of a 15-μm-thick aluminum foil (purity: 99%), which was then treated through drying and pressing processes to manufacture a positive electrode in which the coating amount on one surface was 12.8 mg/cm$^2$, the thickness of the positive electrode layer on one surface was 43 μm and the electrode density was 3.0 g/cm$^3$. The specific surface area of the positive electrode layer was 0.5 m$^2$/g.

In the meantime, a lithium titanate ($Li_4Ti_5O_{12}$) powder having a spinel structure, an average particle diameter of 0.3 μm, a BET specific surface area of 15 m$^2$/g and Li absorbing potential of 1.55 V (vs. Li/Li$^+$), a cokes powder having an average particle diameter of 0.4 μm and a BET specific surface area of 50 m$^2$/g, an acetylene black powder and PVdF which was a binder were formulated in a ratio by weight of 90:6:2:2. These components were dispersed in a n-methylpyrrolidone (NMP) solvent and the dispersion was stirred at 1000 rpm for 2 hours by using a ball mill, to prepare a slurry. The obtained slurry was applied to a 15-μm-thick aluminum alloy foil (purity: 99.3%), followed by drying and a heating pressing process to manufacture a negative electrode in which the coating amount on one surface was 13 mg/cm$^2$, the thickness of the negative electrode layer on one surface was 59 μm and the electrode density was 2.2 g/cm$^3$. The porosity of the negative electrode excluding the current collector was 35%. The BET specific surface area of the negative electrode layer, that is, the surface area per 1 g of the negative electrode layer was 10 m$^2$/g.

A laser diffraction particle size analyzer (trade name: SALD-300, manufactured by Shimadzu Corporation) was used for the measurement of the particle diameter of the negative electrode active material. After placing about 0.1 g of the sample in a beaker, a surfactant and 1 to 2 mL of distilled water were added to the sample and thoroughly stirred, and the solution was injected into a stirring water vessel. The light intensity distribution was measured 64 times at an interval of 2 seconds, the particle size distribution data was analyzed to determine the average particle diameter of the negative electrode active material.

The BET specific surface area of the negative electrode active material and negative electrode were measured using $N_2$ adsorption in the following condition.

1 g of the powdery negative electrode active material or two negative electrodes of 2×2 cm$^2$ were prepared by cutting as samples. As the BET specific surface area measuring device, a device manufactured by Yuasa Ionics Inc. was used and nitrogen gas was used as the adsorption gas.

The porosity of the negative electrode was calculated as follows: the volume of the negative electrode layer was compared with that of the negative electrode layer obtained when its porosity was 0% and an increase in volume from the volume of the negative electrode layer obtained when its porosity was 0% was regarded as a pore volume. When the negative electrode layer was formed on both surfaces of the current collector, the volume of the negative electrode layer was the total volume of the negative electrode layers formed on both surfaces.

The obtained positive electrode and the negative electrode were cut in such a manner that the electrode width Lp of the positive electrode layer was 51 mm, the electrode width Ln of the negative electrode layer was 50 mm, namely, Lp/Ln was 1.02 and the ratio (Sp/Sn) of the area of the positive electrode layer to the area of the negative electrode layer was 1.05. A separator made of a polyethylene porous film 20 μm in thickness was interposed between the obtained positive and negative electrodes. Then, these electrodes with the separator were coiled and pressed into a flat form to obtain an electrode group. In the obtained electrode group, these electrode layers were disposed such that the positive electrode layer covers the negative electrode via the separator. The end part of the positive electrode layer projected over the end part of the negative electrode at both end surfaces perpendicular to the coil axis of the electrode group. Then, the electrode group was received in a container of a thin metal can made of an aluminum alloy (Al purity: 99%) 0.25 mm in thickness.

2.0 mol/L of lithium tetrafluoroborate ($LiBF_4$) as electrolyte was dissolved in a solvent prepared by mixing propylene carbonate (PC), γ-butyrolactone (GBL) and acetonitrile (AN) in a ratio by volume of 30%:40%:30% to thereby prepare a liquid nonaqueous electrolyte (electrolytic solution). This nonaqueous electrolyte was injected into the electrode group received in the container, to thereby manufacture a thin type nonaqueous electrolyte battery having the structure shown in the above FIG. 1 and a thickness of 4 mm, a width of 30 mm and a height of 60 mm.

EXAMPLES 2 TO 18

Thin type nonaqueous electrolyte batteries were manufactured in the same manner as in Example 1 mentioned above except that the composition, form, average particle diameter, average thickness and sticking amount of the particles or layers, positive electrode active material composition, the average particle diameter of the positive electrode active material, and the type of aqueous solution to be used to form the particles or layers, baking temperature, the composition of the nonaqueous solvent and the area ratio of the positive electrode/the negative electrode (Sp/Sn) were set to those shown in the following Tables 1 and 3.

EXAMPLE 19

A thin type nonaqueous electrolyte battery was manufactured in the same manner as in Example 1 except that $Li_{0.1}TiO_2$ having an average particle diameter of 0.1 μm, low crystallinity and a Li absorbing potential of 1.5 V (vs. Li/Li$^+$) was used as the negative electrode active material.

EXAMPLE 20

A nonaqueous electrolyte battery was manufactured in the same manner as in Example 1 except that $Li_2Ti_3O_7$ having an average particle diameter of 0.5 μm, a ramsdellite structure and a Li absorbing potential of 1.5 V (vs. Li/Li$^+$) was used as the negative electrode active material.

EXAMPLE 21

A nonaqueous electrolyte battery was manufactured in the same manner as in Example 1 except that a spinel type lithium-manganese-nickel composite oxide having the composition shown in Table 1 described below as the particles of the positive electrode active material.

COMPARATIVE EXAMPLES 1 TO 7

Thin type nonaqueous electrolyte batteries were manufactured in the same manner as in Example 1 mentioned above except that the composition, form, average particle diameter, average thickness and sticking amount of the particles or layers, positive electrode active material composition, the average particle diameter of the positive electrode active material, and the type of aqueous solution to be used to form the particles or layers, baking temperature, the composition of the nonaqueous solvent and the area ratio of the positive electrode/the negative electrode (Sp/Sn) were set to those shown in the following Tables 2 and 4.

COMPARATIVE EXAMPLE 8

A thin type nonaqueous electrolyte battery was manufactured in the same manner that was explained in the above Example 1 except that graphite having a Li absorbing potential of 0.2 V (vs. Li/Li$^+$) was used as the negative electrode material, the same positive electrode active material as that used in Comparative Example 2 and the composition of the nonaqueous solvent and the area ratio (Sp/Sn) of the positive electrode to the negative electrode were set to those shown in the following Table 4.

COMPARATIVE EXAMPLE 9

A thin type nonaqueous electrolyte battery was manufactured in the same manner as in Example 1 except that a nonaqueous solvent having the same composition as that of Comparative Example 8 was used.

COMPARATIVE EXAMPLE 10

A thin type nonaqueous electrolyte battery was manufactured in the same manner as in Example 1 except that graphite was used as the negative electrode active material.

COMPARATIVE EXAMPLE 11

A thin type nonaqueous electrolyte battery was manufactured in the same manner as in Example 1 except that the MgO$_x$ particles were not stuck to the surface of the positive electrode active material particles.

Each of the obtained nonaqueous electrolyte batteries was made to charge up to 2.8 V at 25° C. at a constant current of 6 A for 6 minutes and then made to discharge up to 1.5 V at a current of 0.12 A to measure discharge capacity. Here, the battery obtained in Example 21 was made to charge up to 3.4 V. A high-temperature cycle test was made in which a charge operation of charging up to 2.8 V at a constant current of 6 A for 6 minutes and then, a discharge operation of discharging to 1.8 V at a constant current of 0.6 A were repeated at 45° C. The cycle life in the cycle test made at 45° C. was defined as the number of cycles when the discharge capacity reached 80% of the initial capacity. Also, a low-temperature performance test was made in which the retentive coefficient of capacity in a discharge operation carried out at −40° C. at a current of 0.6 A was measured. The capacity obtained in a discharge operation carried out at 25° C. at a current of 0.6 A was defined as 100 to calculate each retentive coefficient of capacity.

Moreover, the retentive coefficient of capacity at 25° C. at a current of 15 A was measured by the method described below.

The battery was made to charge up to 2.8 V at 25° C. at a constant current of 6 A for 6 minutes and then made to discharge to 1.8 V at a constant current of 15 A to measure the retentive coefficient of capacity. The capacity obtained in a discharge operation carried out at a current of 0.6 A was defined as 100 to calculate each retentive coefficient of capacity. Here, the battery obtained in Example 21 was made to charge up to 3.4 V.

These results of measurement are shown in the following Tables 1 to 4.

TABLE 1

| | Composition of the particles or layers | Form | Average particle diameter or average thickness (nm) | Amount to adhere (wt %) | Positive electrode active material composition | Average particle diameter (μm) | Type of solution | Baking temperature (° C.) |
|---|---|---|---|---|---|---|---|---|
| Example 1 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 2 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 3 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 4 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 5 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 6 | C | Granular | 30 | 0.05 | LiFePO$_4$ | 0.5 | Aqueous oxalic acid solution | 800 |
| Example 7 | C | Granular | 30 | 0.05 | LiFePO$_4$ | 0.5 | Aqueous oxalic acid solution | 800 |
| Example 8 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 9 | Zr oxide | Granular | 50 | 0.1 | LiCoO$_2$ | 3 | Zr[O(CH$_2$)$_3$CH$_3$]$_4$ | 400 |
| Example 10 | Mg oxide | Layer | 50 | 0.1 | LiCoO$_2$ | 3 | (CH$_3$COO)$_2$Mg$_4$H$_2$O | 400 |
| Example 11 | Mg oxide | Layer | 50 | 0.1 | LiCoO$_2$ | 3 | (CH$_3$COO)$_2$Mg$_4$H$_2$O | 400 |
| Example 12 | Ba oxide | Granular | 60 | 0.12 | LiCoO$_2$ | 3 | (CH$_3$COO)$_2$Ba | 400 |
| Example 13 | Ti oxide | Granular | 60 | 0.12 | LiCoO$_2$ | 3 | Ti[O(CH$_2$)$_3$CH$_3$]$_4$ | 400 |
| Example 14 | B oxide | Granular | 10 | 0.02 | LiCoO$_2$ | 3 | Aqueous boric acid solution | 600 |
| Example 15 | Mg oxide | Layer | 20 | 0.05 | LiMn$_2$O$_4$ | 5 | (CH$_3$COO)$_2$Mg$_4$H$_2$O | 400 |
| Example 16 | Mg oxide | Layer | 50 | 0.1 | LiMn$_2$O$_4$ | 5 | (CH$_3$COO)$_2$Mg$_4$H$_2$O | 400 |
| Example 17 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 18 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 19 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 20 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Example 21 | Zr oxide | Layer | 50 | 0.1 | LiNi$_{0.5}$Mn$_{1.5}$O$_4$ | 5 | Zr[O(CH$_2$)$_3$CH$_3$]$_4$ | 400 |

TABLE 2

| | Composition of the particles or layers | Form | Average particle diameter or average thickness (nm) | Amount to adhere (wt %) | Positive electrode active material composition | Average particle diameter (μm) | Type of solution | Baking temperature (° C.) |
|---|---|---|---|---|---|---|---|---|
| Comparative Example 1 | — | — | — | — | LiCoO$_2$ | 3 | — | — |
| Comparative Example 2 | — | — | — | — | LiNi$_{1/3}$Mn$_{1/3}$Co$_{1/3}$O$_2$ | 3 | — | — |
| Comparative Example 3 | — | — | — | — | LiNi$_{1/3}$Mn$_{1/3}$Co$_{1/3}$O$_2$ | 3 | — | — |
| Comparative Example 4 | — | — | — | — | LiNi$_{1/3}$Mn$_{1/3}$Co$_{1/3}$O$_2$ | 3 | — | — |
| Comparative Example 5 | — | — | — | — | LiNi$_{1/3}$Mn$_{1/3}$Co$_{1/3}$O$_2$ | 3 | — | — |
| Comparative Example 6 | — | — | — | — | LiCoO$_2$ | 3 | — | — |
| Comparative Example 7 | — | — | — | — | LiCoO$_2$ | 3 | — | — |
| Comparative Example 8 | — | — | — | — | LiNi$_{1/3}$Mn$_{1/3}$Co$_{1/3}$O$_2$ | 3 | — | — |
| Comparative Example 9 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Comparative Example 10 | Mg oxide | Layer | 50 | 0.1 | LiNi$_{1/3}$Mn$_{1/3}$Co$_{1/3}$O$_2$ | 3 | (CH$_3$COO)$_2$Mg$_4$H$_2$O | 400 |
| Comparative Example 11 | — | — | — | — | LiNi$_{1/3}$Mn$_{1/3}$Co$_{1/3}$O$_2$ | 3 | — | — |

TABLE 3

| | Nonaqueous solvent composition | Sp/Sn | Discharge capacity at 25° C. (mAh) | 25° C. 15 A retentive coefficient of capacity (%) | −40° C. retentive coefficient of capacity (%) | Cycle life at 45° C. (times) |
|---|---|---|---|---|---|---|
| Example 1 | 30% PC/40% GBL/30% AN | 1.05 | 650 | 80 | 70 | 2000 |
| Example 2 | 30% PC/40% GBL/30% PN | 1.05 | 640 | 75 | 60 | 2000 |
| Example 3 | 30% PC/40% GBL/30% MAN | 1.05 | 630 | 70 | 60 | 2300 |
| Example 4 | 30% PC/70% MPN | 1.05 | 620 | 70 | 65 | 2600 |
| Example 5 | 30% PC/70% GBL | 1.05 | 620 | 55 | 60 | 2800 |
| Example 6 | 30% PC/70% AN | 1.05 | 650 | 70 | 70 | 2000 |
| Example 7 | 30% PC/70% MAN | 1.05 | 650 | 60 | 60 | 2300 |
| Example 8 | 90% PC/10% AN | 1.05 | 650 | 30 | 30 | 2500 |
| Example 9 | 30% EC/70% GBL | 1.05 | 650 | 60 | 80 | 2000 |
| Example 10 | 30% EC/70% GBL | 1.05 | 640 | 60 | 60 | 3000 |
| Example 11 | 70% PC/30% AN | 1.05 | 620 | 40 | 70 | 2600 |
| Example 12 | 30% EC/70% GBL | 1.05 | 620 | 65 | 40 | 1800 |
| Example 13 | 30% EC/70% GBL | 1.05 | 610 | 60 | 40 | 1800 |
| Example 14 | 30% EC/70% GBL | 1.05 | 650 | 50 | 40 | 1200 |
| Example 15 | 30% EC/70% GBL | 1.05 | 630 | 65 | 50 | 1200 |
| Example 16 | 30% PC/40% GBL/30% AN | 1.05 | 610 | 60 | 55 | 1000 |
| Example 17 | 30% PC/40% GBL/30% AN | 1.01 | 620 | 80 | 70 | 1500 |
| Example 18 | 30% PC/40% GBL/30% AN | 1.10 | 650 | 80 | 70 | 2500 |
| Example 19 | 30% PC/40% GBL/30% AN | 1.05 | 670 | 60 | 50 | 1900 |
| Example 20 | 30% PC/40% GBL/30% AN | 1.05 | 660 | 75 | 70 | 2600 |
| Example 21 | 30% PC/30% EC/40% GBL | 1.05 | 550 | 60 | 60 | 1500 |

TABLE 4

| | Nonaqueous solvent composition | Sp/Sn | Discharge capacity at 25° C. (mAh) | 25° C. 15 A retentive coefficient of capacity (%) | −40° C. retentive coefficient of capacity (%) | Cycle life at 45° C. (times) |
|---|---|---|---|---|---|---|
| Comparative Example 1 | 100% GBL | 0.95 | 400 | 40 | 35 | 100 |
| Comparative Example 2 | 100% AN | 1.0 | 300 | 60 | 40 | 50 |
| Comparative Example 3 | 100% MPN | 0.95 | 400 | 30 | 40 | 100 |
| Comparative Example 4 | 95% PC/5% AN | 0.95 | 60 | 30 | 30 | 200 |
| Comparative Example 5 | 30% EC/70% DEC | 0.95 | 600 | 30 | 5 | 200 |

TABLE 4-continued

|  | Nonaqueous solvent composition | Sp/Sn | Discharge capacity at 25° C. (mAh) | 25° C. 15 A retentive coefficient of capacity (%) | −40° C. retentive coefficient of capacity (%) | Cycle life at 45° C. (times) |
|---|---|---|---|---|---|---|
| Comparative Example 6 | 20% EC/80% AN | 0.98 | 400 | 30 | 35 | 50 |
| Comparative Example 7 | 20% EC/80% MPN | 0.95 | 200 | 10 | 40 | 50 |
| Comparative Example 8 | 20% EC/80% GBL | 0.95 | 50 | 0 | 5 | 10 |
| Comparative Example 9 | 20% EC/80% GBL | 1.05 | 400 | 40 | 30 | 150 |
| Comparative Example 10 | 30% PC/40% GBL/30% AN | 1.05 | 550 | 40 | 10 | 100 |
| Comparative Example 11 | 30% PC/40% GBL/30% AN | 1.05 | 500 | 40 | 30 | 60 |

As is clear from Tables 1 to 4, each nonaqueous electrolyte battery obtained in Examples 1 to 21 was superior to those of Comparative Examples 1 to 11 in discharge capacity in a low-temperature (−40° C.) environment, capacity retentive coefficient in a discharge operation at a current as large as 15 A and cycle life performance. Particularly, each nonaqueous electrolyte battery obtained in Examples 1 to 7, 9 to 11, 18 and 20 was superior in any of discharge performance at −40° C., large-current discharge characteristics at a current of 15 A and high-temperature (45° C.) cycle life performance. In the most preferable combination, EC and GBL were used as the nonaqueous solvent, $Li_xCoO_2$ was used as the positive electrode active material and a compound containing Mg was used as the coating material. A nonaqueous electrolyte battery having such a combination was most superior in high-temperature (45° C.) cycle performance as indicated by Example 10.

Also, it can be understood from Comparative Examples 9 to 11 that if any one of the nonaqueous solvent, positive electrode active material and negative electrode active material is out of the aspect defined in this embodiment, the battery has inferior performances.

The Li absorbing potential of the negative electrode active material used in the above examples was measured using the method explained below.

The negative electrode used in each example was cut into a size of 2 cm×2 cm to make a working electrode. The working electrode and a counter electrode made of a lithium metal foil of 2.2 cm×2.2 cm were made to face each other through a glass filter separator and a lithium metal was inserted as a reference electrode in such a manner as to be in contact with neither the working electrode nor the counter electrode. These electrodes were received in a glass cell of a three pole type and each of the working electrode, counter electrode and reference electrode was connected to a terminal of the glass cell. 1.5 M/L of lithium tetrafluoroborate ($LiBF_4$) was dissolved in a solvent prepared by mixing ethylene carbonate and γ-butyrolactone in a ratio by volume of 1:2 to prepare an electrolytic solution. 25 mL of this electrolytic solution was poured to allow the separator and electrodes to be impregnated sufficiently and then, the glass container was sealed. The manufactured glass cell was disposed in a 25° C. thermostat and was made to charge at a current density of 0.1 mA/cm² to measure the lithium ion absorbing potential of the working electrode. In this case, the value of the lithium ion absorbing potential in the condition that the battery charges up to 50% was defined as the lithium ion absorbing potential.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a positive electrode containing active material particles and a coating material which covers a surface of each of the active material particles, wherein the active material particles are represented by the following formula (3) and have an average particle diameter of 0.1 to 10 µm, the coating material comprises at least particles having an average particle diameter of 60 nm or less or layers having an average thickness of 60 nm or less, the particles or the layers containing at least one selected from the group consisting of C and a phosphorous oxide of at least one element selected from the group consisting of Mg, Ti, Zr, Ba and B;
a negative electrode including a metal compound absorbing lithium ions at 0.4 V (vs. Li/Li+) or more;
a separator interposed between the positive electrode and the negative electrode; and
a nonaqueous electrolyte including a mixture solvent and a lithium salt to be dissolved in the mixture solvent, the mixture solvent containing a first nonaqueous solvent containing at least one of propylene carbonate and ethylene carbonate and a second nonaqueous solvent containing at least one of γ-butyrolactone and a nonaqueous solvent having a nitrile group and a molecular weight of 40 to 100, and a content of the second nonaqueous solvent in the mixture solvent being 10 to 70% by volume:

$$Li_sM3_tPO_4 \qquad (3)$$

where M3 represents at least one element selected from the group consisting of Mn, Ni, Co and Fe, and s and t satisfy the following requirements: $0<s\leq 1.1$ and $0.8\leq t\leq 1.1$.

2. The nonaqueous electrolyte battery according to claim 1, wherein the active material particles are represented by the formula (3), and the particles or the layers contain at least one element selected from the group consisting of Mg, Ti and C.

3. The nonaqueous electrolyte battery according to claim 1, wherein an amount of the coating material is 0.001% to 3% by weight.

4. The nonaqueous electrolyte battery according to claim 1, wherein the average particle diameter or the average thickness is 0.1 to 60 nm.

5. The nonaqueous electrolyte battery according to claim 1, wherein the positive electrode comprises a positive electrode layer containing the active material particles and the negative electrode comprises a negative electrode layer containing the metal compound, wherein the positive electrode layer faces the negative electrode layer through the separator and an end part of the positive electrode layer projects over an end part of the negative electrode layer.

6. The nonaqueous electrolyte battery according to claim 1, wherein the nonaqueous solvent is at least one type selected from the group consisting of acetonitrile, propionitrile, methoxyacetonitrile and 3-methoxypropionitrile.

7. The nonaqueous electrolyte battery according to claim 1, wherein the lithium salt contains $LiBF_4$ and a concentration of $LiBF_4$ in the mixture solvent is 1.5 mol/L or more.

8. The nonaqueous electrolyte battery according to claim 1, wherein the metal compound is lithium-titanium oxide or a titanium oxide.

9. The nonaqueous electrolyte battery according to claim 1, wherein the active material particles have an olivine structure.

10. The nonaqueous electrolyte battery according to claim 1, wherein the M3 is at least one element selected from the group consisting of Mn and Fe.

11. A battery pack comprises a nonaqueous electrolyte battery, the nonaqueous electrolyte battery comprising:
    a positive electrode containing active material particles and a coating material which covers a surface of each of the active material particles, wherein the active material particles are represented by the following formula (3) and have an average particle diameter of 0.1 to 10 μm, the coating material comprises at least particles having an average particle diameter of 60 nm or less or layers having an average thickness of 60 nm or less, the particles or the layers containing at least one selected from the group consisting of C and a phosphorous oxide of at least one element selected from the group consisting of Mg, Ti, Zr, Ba, and B;
    a negative electrode including a metal compound absorbing lithium ions at 0.4 V (vs. Li/Li+) or more;
    a separator interposed between the positive electrode and the negative electrode; and
    a nonaqueous electrolyte including a mixture solvent and a lithium salt to be dissolved in the mixture solvent, the mixture solvent containing a first nonaqueous solvent containing at least one of propylene carbonate and ethylene carbonate and a second nonaqueous solvent containing at least one of γ-butyrolactone and a nonaqueous solvent having a nitrile group and a molecular weight of 40 to 100, and a content of the second nonaqueous solvent in the mixture solvent being 10 to 70% by volume:

$$Li_sM3_tPO_4 \quad (3)$$

where M3 represents at least one element selected from the group consisting of Mn, Ni, Co and Fe, and s and t satisfy the following requirements: $0<s\leq1.1$ and $0.8\leq t\leq1.1$.

12. The battery pack according to claim 11, wherein the active material particles are represented by the formula (3), and the particles or the layers contain at least one element selected from the group consisting of Mg, Ti and C.

13. The battery pack according to claim 11, wherein an amount of the coating material is 0.001 to 3% by weight.

14. The battery pack according to claim 11, wherein the average particle diameter or the average thickness is 0.1 to 60 nm.

15. The battery pack according to claim 11, wherein the positive electrode comprises a positive electrode layer containing the active material particles and the negative electrode comprises a negative electrode layer containing the metal compound, wherein the positive electrode layer faces the negative electrode layer through the separator and an end part of the positive electrode layer projects over an end part of the negative electrode layer.

16. The battery pack according to claim 11, wherein the nonaqueous solvent is at least one type selected from the group consisting of acetonitrile, propionitrile, methoxyacetonitrile and 3-methoxypropionitrile.

17. The battery pack according to claim 11, wherein the lithium salt contains $LiBF_4$ and a concentration of $LiBF_4$ in the mixture solvent is 1.5 mol/L or more.

18. The battery pack according to claim 11, wherein the metal compound is lithium-titanium oxide or a titanium oxide.

19. The battery pack according to claim 11, wherein the active material particles have an olivine structure.

20. The battery pack according to claim 11, wherein the M3 is at least one element selected from the group consisting of Mn and Fe.

* * * * *